Dec. 16, 1941.   W. G. MARTIN ET AL   2,266,611
CONNECTION FOR GLASS LINED TANKS
Filed May 18, 1940

John H. Crider
Wesley G. Martin
INVENTORS.

BY
ATTORNEY.

Patented Dec. 16, 1941

2,266,611

UNITED STATES PATENT OFFICE 2,266,611

CONNECTION FOR GLASS LINED TANKS

Wesley G. Martin and John H. Crider, Milwaukee, Wis., assignors to A. O. Smith Corporation, Milwaukee, Wis., a corporation of New York Application May 18, 1940, Serial No. 335,998

5 Claims. (Cl. 285—49)

This invention relates to a pipe connection for tanks or containers interiorly lined with glass or vitreous enamel and to a method of making the same.

An object of the invention is to provide an improved fitting for the attachment of pipes leading fluid to or from a tank lined with vitreous enamel.

A further object of the invention is to provide a method for the manufacture of the connection and its attachment to the tank.

These and other objects of the invention will be clear from the following description and the accompanying drawing in which.

Figure 1:
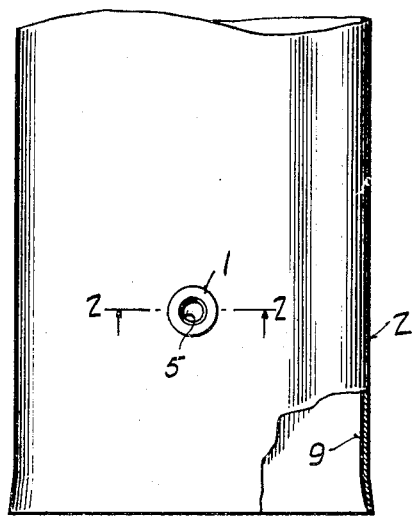
Figure 1 is an elevation of a portion of a tank shell and a pipe connection.
Figure 2:
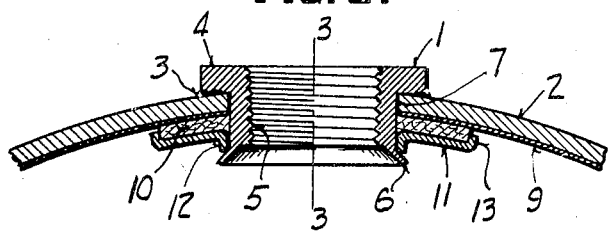
Fig. 2 is an enlarged section on line 2—2 of Fig. 1.
Figure 3:
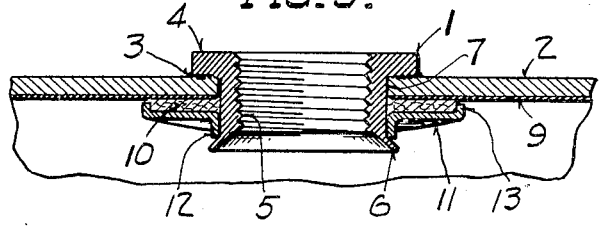
Fig. 3 is a section on the line 3—3 of Fig. 2.

A pipe connection for a glass lined tank must be such that the entire internal surface of the tank is adequately protected against the corrosive influence of the fluid which it contains; it must not allow sufficient concentration of stresses at the connection to stress the metal of the tank beyond its yield point and damage the glass lining; and it must obviously provide for the attachment of the pipes or tubes through which fluid is led to or from the tank. Numerous methods of attachment to the pipes are possible but it is preferred to provide a fitting with an internal thread into which the pipes can be screwed.

Referring to the drawing in which a pipe connection is shown applied to the shell of a hot water tank, the connection comprises a fitting 1 secured to the shell 2 by means of a weld 3. The fitting has a flange 4 of larger diameter than the hole provided in the tank for the reception of the fitting; screw threads 5 for making a threaded joint with the piping to which the tank is to be connected; and a thinned inner end or skirt 6 projecting inside of the tank. The fitting is made of stainless steel, Monel metal, or other suitable material capable of resisting the corrosive action of the fluids within the tank and of being readily welded to the steel shell.

Figure 4:
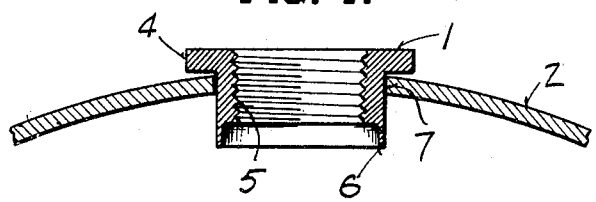
Fig. 4 is a section similar to Fig. 2 showing the shell and fitting in the positions which they occupy just prior to being welded together.
Figure 5:
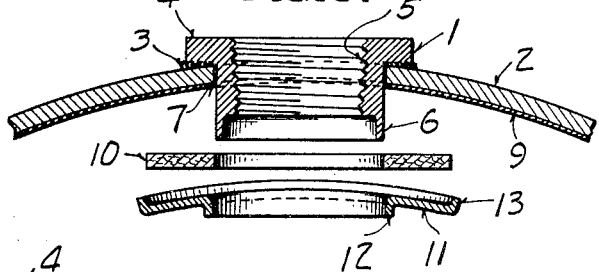
Fig. 5 is a view similar to Fig. 4 after welding and enameling, with the packing and metal washer positioned for assembly.

In making up the connection of this invention, the shell of the tank is provided with a hole 7 of sufficient diameter to admit the fitting. The fitting is then assembled in the shell as shown in Fig. 4 and the flange of the fitting is joined to the outside of the shell. Various methods of welding or brazing can be employed but electric resistance welding is preferred. It has been found that a completely tight and sound weld can be made despite the curvature of the shell which causes contact to be made sooner at some points of the shell and flange than at others.

Figure 6:
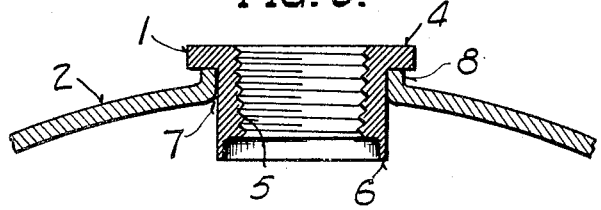
Fig. 6 is a view similar to Fig. 4 showing a modified embodiment of the invention.

In the alternative construction shown in Fig. 6 the opening 7 in the shell is flared at 8 to form a flange which meets the flange on the fitting. The flange on the shell can be faced off to form a plane surface before welding, and when this is done, contact is established between all points on the two flanges at substantially the same time. This procedure may be preferable to that shown in Fig. 4 for certain types of welding equipment but is not essential. With suitable equipment a thoroughly satisfactory weld can be made with the procedure illustrated in Fig. 4.

After the fitting has been welded to the shell, enamel frit is applied to the interior of the shell and fused thereon to form a vitreous enamel or glass lining 9. As difficulty is experienced in securing satisfactory adherence of the enamel to both the steel shell 2 of the tank and to the alloy fitting 1, an asbestos or other suitable packing washer 10 and a metal washer 11, preferably of the same metal as that used in the fitting 1, are slipped over the projection 6 of the fitting which extends inside the tank. Since the fitting and the enamel are applied to the shell before both heads are secured to the shell, it will be seen that the two washers can be readily inserted through the open end of the shell. The metal washer 11 is contoured complementary to the tank wall on which it bears, allowance being made for the washer 10, and is desirably provided with an inwardly extending central flange 12 around the opening. The inner edge of the flange 12 is in a plane parallel to the plane of the face of the fitting. After the washers have been slipped in place, the skirt 6 of the fitting is flared out or expanded to engage the flange 12 and cause the washer 11 to uniformly compress and hold the asbestos washer against the tank wall. The asbestos washer will prevent free access of water to any cracks or defects in the enamel which may exist at the juncture between the steel shell and the alloy fitting. An outwardly extending peripheral flange 13 of less height than the thickness of washer 10 may be formed on the washer 11 to confine the packing 10. The flanges 12 and 13 also act to reenforce the washer.

While the fitting has been described in connection with its application to the shell of a glass lined tank, it is to be understood that similar fittings can be applied in substantially the same way to the heads of such a tank, or to the shell and heads of tanks provided with any type of corrosion resistant lining.

We claim:

1. In combination with a tank having a corrosion resistant lining of vitreous enamel, a fitting of corrosion resistant metal, said fitting extending through an opening in the tank and being welded to the tank around the edge of the opening, a washer of packing material around the inwardly projecting section of the fitting and engaging the inner surface of the vitreous enamel lining over a substantial area to prevent fluid from circulating in contact with the metal of the tank at the edge of the opening, a metal washer superimposed upon the washer of packing material and substantially covering the same to protect it from the contents of the tank and to increase the effective depth of the packing washer in preventing fluid circulation, and means on the inwardly projecting section of the fitting to hold the metal washer against the packing washer.

2. In combination with a tank having a corrosion resistant lining of vitreous enamel, a fitting of corrosion resistant metal, said fitting extending through an opening in the tank and being welded to the tank around the edge of the opening, an asbestos washer around the inwardly projecting section of the fitting and engaging the inner surface of the vitreous enamel lining over a substantial area around the opening in the tank to prevent fluid from circulating in contact with the metal of the tank at the edge of the opening, a metal washer superimposed upon the asbestos washer and substantially covering the same to protect it from exposure to the contents of the tank, and means on the inwardly projecting section of the fitting to hold the metal washer against the asbestos washer.

3. In combination with a tank having a corrosion resistant lining, a fitting of corrosion resistant metal, said fitting extending through an opening in the tank and being welded to the tank around the edge of the opening, a washer of packing material around the inwardly projecting section of the fitting and engaging the inner surface of the lining over a substantial area to prevent fluid from circulating in contact with the metal of the tank at the edge of the opening, a flanged metal washer superimposed upon the washer of packing material, said metal washer having a flange at its outer circumference extending over the edge of the packing washer and a flange at its inner edge extending away from the tank wall, and a skirt on the inwardly projecting section of the fitting peened over to bear against the inner flange on the metal washer and hold it against the packing washer.

4. In combination with a tank having a corrosion resistant lining, a fitting of corrosion resistant metal, said fitting extending through an opening in the tank and being welded to the tank around the edge of the opening, a washer of packing material around the inwardly projecting section of the fitting and engaging the inner surface of the lining over a substantial area to prevent fluid from circulating in contact with the metal of the tank at the edge of the opening, a flanged metal washer shaped to fit closely against the inside of the tank superimposed upon the washer of packing material, said metal washer having a flange at its outer circumference extending over the edge of said packing washer to protect the latter against action by the contents of the tank and increase its effective depth against fluid circulation and a flange at its inner edge extending in the opposite direction, and means on the inwardly projecting section of the fitting to bear against the inner flange on the metal washer and hold it against the packing washer.

5. In combination with a tank having a corrosion resisting lining, a non-corrosive metal fitting disposed in an opening in the tank and being welded to the tank around the edge of the opening, a soft washer of asbestos, or the like, disposed around the inner end of the fitting and engaging the inner surface of the lining over a substantial area to prevent fluid from circulating in contact with the metal of the tank at the edge of the opening, and means on the inner end of the fitting and engaging the packing washer for holding said washer pressed against the inner lining and wall of the tank.

WESLEY G. MARTIN.
JOHN H. CRIDER.